(12) United States Patent
Kain et al.

(10) Patent No.: US 11,745,748 B2
(45) Date of Patent: Sep. 5, 2023

(54) METHOD AND DEVICE FOR OPERATING AN AUTOMATICALLY DRIVING VEHICLE

(71) Applicant: Volkswagen Aktiengesellschaft, Wolfsburg (DE)

(72) Inventors: Tobias Kain, Wolfsburg (DE); Julian-Steffen Müller, Hannover (DE); Maximilian Wesche, Edemissen (DE); Hendrik Decke, Braunschweig (DE); Fabian Plinke, Hamburg (DE); Andreas Braasch, Wuppertal (DE); Johannes Heinrich, Cologne (DE); Timo Horeis, Hamburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 109 days.

(21) Appl. No.: 17/148,871

(22) Filed: Jan. 14, 2021

(65) Prior Publication Data
US 2021/0213964 A1 Jul. 15, 2021

(30) Foreign Application Priority Data

Jan. 15, 2020 (DE) ..................... 10 2020 200 458.7
Mar. 17, 2020 (DE) ..................... 10 2020 203 419.2

(51) Int. Cl.
*B60W 50/023* (2012.01)
*B60W 50/02* (2012.01)
*B60W 60/00* (2020.01)

(52) U.S. Cl.
CPC ...... *B60W 50/023* (2013.01); *B60W 50/0205* (2013.01); *B60W 60/007* (2020.02); *B60W 60/0015* (2020.02)

(58) Field of Classification Search
CPC ........... B60W 50/023; B60W 50/0205; B60W 60/0015; B60W 60/007; B60W 50/029;
(Continued)

(56) References Cited

U.S. PATENT DOCUMENTS

| 8,452,465 B1 | 5/2013 | Sinha et al. | 701/2 |
| 8,566,633 B2 | 10/2013 | Fuhrman et al. | 714/3 |

(Continued)

FOREIGN PATENT DOCUMENTS

| DE | 102012002280 A1 | 8/2012 | B60R 16/02 |
| DE | 102013205285 A1 | 10/2013 | B60W 50/02 |
| DE | 102015203124 A1 | 8/2015 | F16H 55/30 |

OTHER PUBLICATIONS

German Office Action, Application No. 102020203419.2, 7 pages, dated Sep. 8, 2020.

*Primary Examiner* — Adam R Mott
*Assistant Examiner* — Erick T. Detweiler
(74) *Attorney, Agent, or Firm* — Slayden Grubert Beard PLLC

(57) ABSTRACT

The disclosure provides a method for operating an automatically driving vehicle, wherein application instances are executed over several computational nodes, wherein recognized faults are reacted to by switching to redundant application instances and then reconfiguring the configuration to restore specified redundancy conditions and/or segregation conditions, wherein the vehicle is transitioned to a safe state using at least one failover apparatus when at least one specified redundancy condition and/or at least one segregation condition cannot be met by the reconfiguration, and/or a specified time for reconfiguration is exceeded, and/or an unrecoverable malfunction has been recognized, wherein the at least one failover apparatus plans an emergency trajectory using a trajectory planner, wherein sensor data are detected via separate signal lines and supplied to the at least one (Continued)

failover apparatus, and wherein control signals are generated and transmitted via separate control lines to an actuator system of the vehicle.

20 Claims, 2 Drawing Sheets

(58) Field of Classification Search
CPC ............ B60W 50/032; B60W 60/001; B60W 2050/0292
See application file for complete search history.

(56) References Cited

U.S. PATENT DOCUMENTS

| | | |
|---|---|---|
| 9,500,271 B2 | 11/2016 | Yokoyama et al. |
| 10,782,685 B1* | 9/2020 | Sucan .................. G05D 1/0088 |
| 2015/0012166 A1* | 1/2015 | Hauler .................. G05D 1/0268 |
| | | 701/23 |

* cited by examiner

METHOD AND DEVICE FOR OPERATING AN AUTOMATICALLY DRIVING VEHICLE

CROSS-REFERENCE TO RELATED APPLICATIONS

This application claims priority to German Patent Application No. 10 2020 200 458.7, filed on Jan. 15, 2020 with the German Patent and Trademark Office. This application further claims priority to German Patent Application No. 10 2020 203 419.2, filed on Mar. 17, 2020 with the German Patent and Trademark Office. The contents of the aforesaid patent applications are incorporated herein for all purposes.

TECHNICAL FIELD

The invention relates to a method and a device for operating an automatically driving vehicle. The invention further relates to a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern machines have an ever-growing number of technical components that are in interaction with each other. To ensure ongoing operation even in the event of a fault in one or more of these components, the FDIR (fault, detection, isolation, recovery) method is known from the field of aviation. In this case, faults are recognized by monitoring. A recognized fault is then isolated by switching from an affected component to a redundant component held in readiness with the same functionality. After switching, an attempt is made to restore redundancy by activating additional components. Until now, however, a human backup level has always been available in which control can be assumed manually when the method fails.

SUMMARY

An object exists to create a method and a device for operating an automatically driving vehicle with which a safe state can be better maintained even without a human backup level.

The object is achieved by a method and a device according to the independent claims. Embodiments of the invention are discussed in the dependent claims and the following description.

The details of one or more embodiments are set forth in the accompanying drawings and the description below. Other features will be apparent from the description, drawings, and from the claims.

DESCRIPTION

Figure 1:
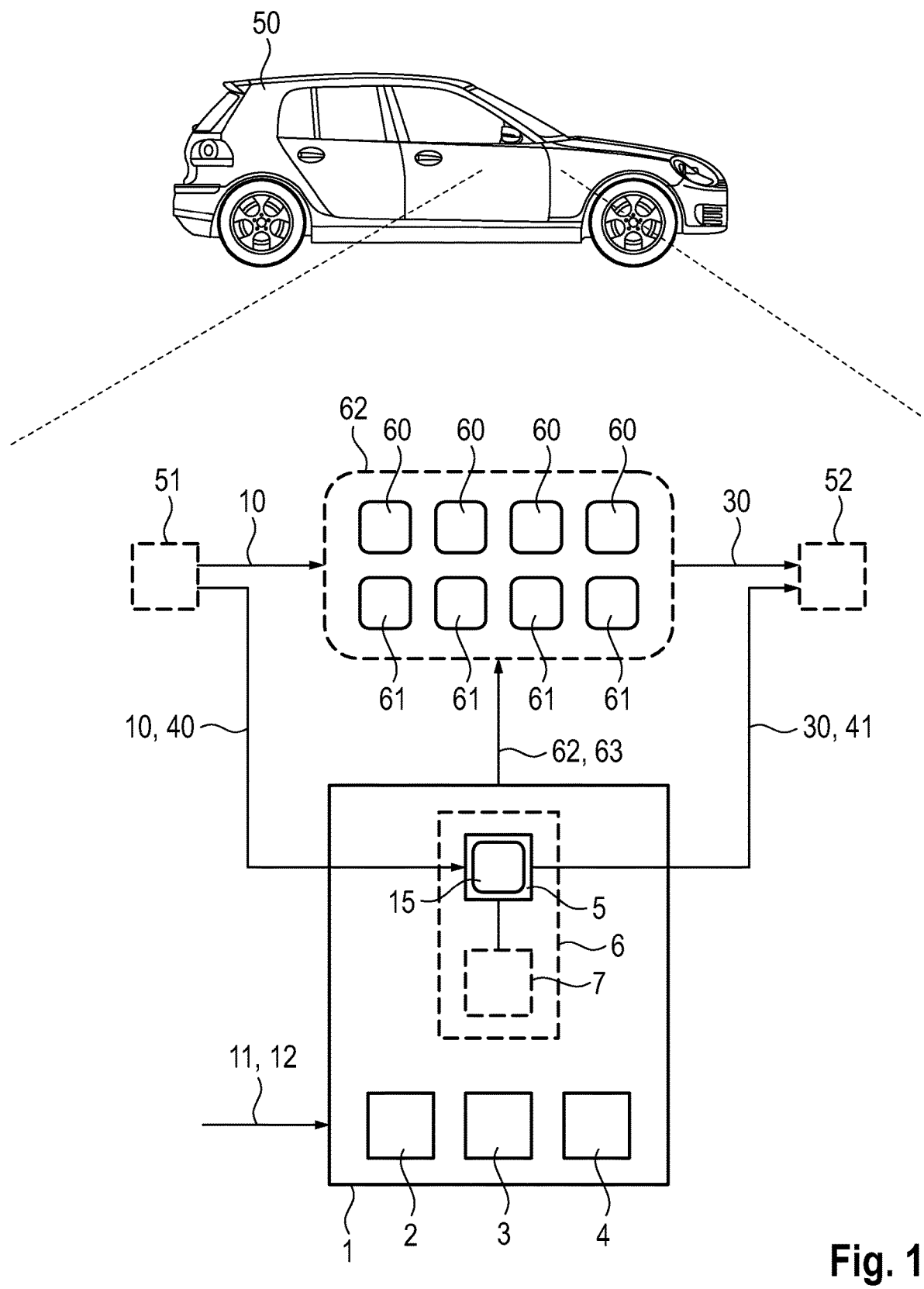
FIG. 1 shows a schematic representation of an embodiment of the device for operating an automatically driving vehicle.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method for operating an automatically driving vehicle is provided, wherein application instances are executed according to a specified configuration distributed over several computational nodes, wherein detected sensor data from a sensor system are supplied to at least part of the application instances, and wherein control signals are generated and provided from at least part of the application instances to control the vehicle, wherein there is a reaction to recognized faults by switching to redundant application instances and then reconfiguring the configuration to restore specified redundancy conditions and/or segregation conditions, wherein the vehicle is transitioned into a safe state by means of at least one failover apparatus when at least one specified redundancy condition and/or at least one segregation condition cannot be met by the reconfiguration, and/or a specified time for reconfiguration is exceeded, and/or an unrecoverable malfunction is recognized, wherein the at least one failover apparatus plans and executes an emergency trajectory to this end by means of a trajectory planner, wherein sensor data to this end are detected via separate signal lines by means of a sensor system of the vehicle and supplied to the at least one failover apparatus, and wherein control signals to this end are generated by means of the at least one failover apparatus and transmitted via separate control lines to an actuator system of the vehicle.

In another exemplary aspect, a device for operating an automatically driving vehicle is provided, wherein in the vehicle, application instances are executed according to a specified configuration distributed over several computational nodes, wherein detected sensor data from a sensor system are supplied to at least part of the application instances, and wherein control signals are generated and provided from at least part of the application instances to control the vehicle; comprising at least one failover apparatus with separate signal lines to a sensor system of the vehicle and with separate control lines to an actuator system of the vehicle, wherein the device is configured to react to recognized faults by switching to redundant application instances and then reconfiguring the configuration to restore specified redundancy conditions and/or segregation conditions, wherein the at least one failover apparatus is designed to transition the vehicle into a safe state when at least one specified redundancy condition and/or at least one segregation condition cannot be met by the reconfiguration, and/or a specified time for reconfiguration is exceeded, and/or an unrecoverable malfunction has been recognized, wherein the at least one failover apparatus has a trajectory planner to this end that is configured to plan and execute an emergency trajectory, wherein the at least one failover apparatus is designed to this end to receive detected sensor data from the sensor system of the vehicle via the separate signal lines, and to generate control signals and transmit them via the separate control lines to the actuator system of the vehicle.

The method and the device according to the preceding exemplary aspects make it possible to maneuver the vehicle into a safe state when the reconfiguration does not permit safe continued driving. The reason for this can be that at least one specified redundancy condition and/or at least one specified segregation condition cannot be met, for example because after a fault or defect, computational nodes are not (any longer) sufficiently available to operate all necessary application instances redundantly and/or with a specified segregation. Other reasons may be that a specified time for reconfiguring has been exceeded (such as 90, 100 or 200 ms, etc.), and/or an unrecoverable malfunction was recognized. An unrecoverable malfunction may for example exist when the sensor system supplies faulty sensor data due to defective signal lines. In order to bring the vehicle into the safe state, the at least one failover apparatus plans an emergency trajectory by means of the trajectory planner. The emergency trajectory includes for example driving the vehicle to an edge of a road and parking there. To this end, sensor data are detected via separate signal lines by means of a sensor system of the vehicle and supplied to the at least one failover apparatus. Furthermore to this end, control signals are generated by means of the least one failover apparatus and transmitted via separate control lines to an actuator system, in particular to a transverse and longitudinal guide of the vehicle. The trajectory planner plans the trajectory with the inclusion of a current traffic situation, a current environment, and other road users. The failover apparatus may therefore have, or respectively provide, additional functionalities such as for example environmental sensing, object recognition and/or prediction of the behavior of other road users.

Herein, the term 'fault' is used interchangeably with 'error', 'defect', and 'malfunction'.

A benefit of the exemplary method and the exemplary device is that additionally, an automated backup level is created that can transition the vehicle into a safe state when automated driving under the specified (safety) conditions is no longer possible. An additional safeguard is achieved by the separately designed signal and control lines. In addition, faults and defects in the regularly used lines may also be captured thereby.

An application for automated driving may be provided by at least one application instance. An application instance may be for example a process that provides a certain functionality and that is executed in at least one computational node. For example, an application instance may provide one of the following functionalities in conjunction with automated driving: environmental sensing, localization, navigation, a trajectory planner or a forecast of intrinsic behavior and/or the behavior of objects in the environment of the vehicle, etc. To accomplish this, at least a part of the application instances receive sensor data that were detected using a sensor system, and/or data from other application instances. At least part of the application instances provide control signals for an actuator system of the vehicle. The application instances may for example be operated in one active and at least one passive operating state. In the active operating state, the application instance has a direct influence on controlling the vehicle. In at least one passive operating state, one application instance contrastingly runs redundantly along with an equivalent active application instance, is supplied the same input data, and generates the same output data, or respectively control signals, but does not have any influence on controlling the vehicle. Different levels of the passive state can be provided that, for example, only differ in terms of how fast a passive application instance can be transitioned into the active operating state. In the context of the method, for example, both the active as well as the passive application instances may be monitored. In the event of a fault affecting the passive application instances, the method can then be correspondingly executed, wherein isolation and switching over can be omitted, and an affected passive application instance can merely be terminated and replaced with a newly started passive application instance having the same functionality to restore conditions of redundancy.

Some embodiments include an assignment of active and passive application instances to individual computational nodes. For example, the configuration establishes which application instance is executed in which computational node, as well as the associated operating states of the application instances. The configuration is dependent on specified redundancy conditions and/or segregation conditions that are or will be specified depending on the functionalities of the application instances. For example, it can be provided that the redundancy condition stipulates a single redundancy. One active application instance and one passive application instance may then be operated for one application, or respectively one functionality. Depending on the application scenario, different redundancy conditions may be provided for the equivalent functionalities, for example a single redundancy (for example pedestrian recognition on a highway) or multiple redundancy (such as quadruple redundancy for pedestrian recognition on a play street).

A segregation condition is for example a specification for a number of different computational nodes in which an application must be executed by redundant application instances. A segregation condition can relate to both software as well as hardware. For example, a segregation condition may comprise that redundant application instances of an application must each be executed on a specified number of different operating systems. Moreover, for example, a segregation condition may comprise that redundant application instances of an application must be executed separately from each other in a specified number of different computational nodes.

For example, it is provided that faults are monitored with at least one monitoring apparatus, wherein the at least one monitoring apparatus is configured to monitor the application instances, and/or operating systems, and/or hardware corresponding to the computational nodes, and to recognize a fault in an application instance, and/or in an operating system, and/or in hardware.

It may be provided in some embodiments that one monitoring apparatus is used for each application instance. Furthermore, it may be provided that one monitoring apparatus is used for each operating system and/or each piece of hardware. Monitoring may thereby be executed more reliably and faster so that a fault may be recognized faster.

Furthermore and in some embodiments, it is provided that switching over is carried out using a switching apparatus. The switching apparatus isolates a fault in the application instances recognized, e.g., by the monitoring apparatus by switching to application instances that are redundant to the affected application instances.

A redundancy may for example be restored by a redundancy restoration apparatus. The redundancy restoration apparatus restores redundancy conditions specified for the application instances by reconfiguring the configuration.

Parts of the device, for example the at least one monitoring apparatus, the switching apparatus, and/or the redundancy restoration apparatus, and/or the at least one failover apparatus may be designed individually or together as a combination of hardware and software, for example as program code that is executed in a micro-controller or a microprocessor. It may however also be provided that the parts are designed individually or together as an application-specific integrated circuit (ASIC).

The vehicle may for example be a motor vehicle. In principle, the vehicle may however also be another land vehicle, watercraft, aircraft, rail vehicle, or spacecraft.

Some embodiments provide that the at least one failover apparatus receives exclusive access to the actuator system of the vehicle in an emergency. This can prevent a disruption from malfunctioning application instances when executing the emergency trajectory. For example, it may be provided that all application instances are decoupled from access to the actuator system, and the actuator system of the vehicle is controlled, or respectively regulated exclusively by means of the at least one failover apparatus. If several redundant failover apparatuses exist, controlling is carried out by means of the failover apparatus which is in the "active" operating state.

Some embodiments provide that the at least one failover apparatus is operated in a robust housing. For example, the housing should be able to withstand mechanical influences as typically occur in accidents. After an accident, this can ensure that transposing the vehicle into a safe state by the at least one failover apparatus is still possible. The housing may for example be designed particularly shock resistant. For example, the housing may be designed similar to the flight data recorder (black box) known from airplane engineering. Accordingly, the vehicle can be brought into a safe state even after an impact or other damage such as for example a fire or explosion, etc., to the extent that this is still possible by means of the actuator system.

Some embodiments provide that the at least one failover apparatus is operated at a location in the vehicle protected from external effects and manipulations. For example, it is provided that the at least one failover apparatus is installed in the proximity or on an underbody of the vehicle, e.g., in the middle of the vehicle. This protects the at least one failover apparatus on the one hand from desired or undesired manipulation; on the other hand, this also protects the at least one failover apparatus from external influences in the event of an accident.

Therefore, the vehicle can also be brought into a safe state after an impact, to the extent that this is still possible by means of the actuator system.

Some embodiments provide that the trajectory planner and other functions of the at least one failover apparatus are provided by means of a separate computing apparatus. To this end, the device has for example a computing apparatus reserved for the at least one failover apparatus, or respectively at least one reserved computational node.

Some embodiments provide that the at least one failover apparatus is supplied by means of a separate energy supply, at least during an emergency. For example, some embodiments of the device correspondingly provide that the at least one failover apparatus has a separate energy supply which is configured to supply the at least one failover apparatus with energy, at least during an emergency. The separate energy supply can for example be a battery that is always recharged by an onboard electrical system, and with which the at least one failover apparatus can be supplied.

Some embodiments provide that the at least one failover apparatus is operated redundantly. This can even protect a functionality of the at least one failover apparatus against a failure or malfunction. For example, it may be provided that the at least one failover apparatus is operated redundantly in several computational nodes, wherein the failover apparatuses are then assigned an "active", or respectively (graduated) "passive" operating state like the application instances.

Additional features of the design of the device are apparent from the description of embodiments of the method. The benefit of the device in this context are always the same as the designs of the method.

Furthermore, a vehicle is also provided comprising at least one device according to one or more of the described aspects or embodiments, wherein the at least one failover apparatus is arranged at a location in the vehicle protected from external effects and manipulations.

In the following, the invention will be explained in greater detail based on further exemplary embodiments and with reference to the FIGS.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a schematic representation of an embodiment of the device 1 for operating an automatically driving vehicle 50. In the vehicle 50, application instances 60, 61 are executed according to a specified configuration 62 distributed over several computational nodes. The application instances 60, 61 provide for example a functionality for environmental sensing, localization, navigation and/or trajectory planning. At least part of the application instances 60, 61 are supplied detected sensor data 10 from a sensor system 51 of the vehicle 50 (or from any other sensor system detecting for example an environment of the vehicle 50). Control signals 30 for controlling the vehicle 50 are generated and provided by at least part of the application instances 60, 61. The provided control signals 30 of the active application instances 60 are supplied to an actuator system 52 of the vehicle 50 that implements automated driving of the vehicle 50.

The device 1 comprises for example a monitor apparatus 2, a switching apparatus 3, and a redundancy restoration apparatus 4. In particular, a monitor apparatus 2 is provided for each of the application instances 60, 61, for each operating system, and for each piece of hardware providing the computational nodes (for the sake of clarity, only one monitor apparatus 2 is shown). Parts of the device 1 may be formed individually or together as a combination of hardware and software, for example as programmed code that is executed in a micro-controller or a microprocessor. It may moreover be provided that a functionality of the application instances 60, 61 and the device 1 is provided jointly, for example by means of a data processing apparatus of the vehicle 50.

The application instances 60, 61, and/or operating systems, and/or a piece of hardware corresponding to the computational nodes are monitored by the monitor apparatus 2. The monitor apparatus 2 recognizes faults in the application instances 60, 61, and/or the operating systems, and/or in the piece of hardware.

If a fault is recognized, the recognized fault is isolated by means of the switching apparatus 3 by switching to passive application instances 61 that are redundant with the application instances 60 affected by the fault. To this end, the switching apparatus 3 activates the particular redundant, passive application instance 61 that takes over the functionality of the application instance 60 affected by the fault while the affected application instance 60 is deactivated. This is accomplished for example by means of a switchover signal 63. If several application instances 60 are affected, the redundant passive application instances 61 are each correspondingly activated.

Once the switchover has occurred, the redundancy conditions 11 and/or segregation conditions 12 specified for the application instances 60, 61 are restored by means of the redundancy restoration apparatus 4 by reconfiguring the configuration 62.

The redundancy conditions 11 comprise in particular instructions on which application instance 60 should, or respectively must be operated with which redundancy (none, one, two, multiple). The reconfigured configuration 62 is set by correspondingly configuring the application instances 60, 61. The reconfiguration in this context comprises in particular starting and setting up other passive application instances 61, in order to (again) fulfill a particular redundancy condition 11, and/or segregation condition 12. If a formerly passive application instance 61 is activated when there is a required redundancy because of a fault and a formerly active application instance 60 is deactivated for isolation, a new passive application instance 61 is set up and started in one of the computational nodes so that redundancy is restored. When there are several application instances 60 to be isolated, the procedure is analogous.

The device 1 comprises a failover apparatus 5 with separate signal lines 40 for a sensor system 51 of the vehicle 50, and with separate control lines 41 for an actuator system 52 of the vehicle 50.

The vehicle 50 is transitioned into a safe state by means of the failover apparatus 5 when at least one specified redundancy condition 11 and/or segregation condition 12 cannot be fulfilled by the reconfiguration, and/or a specified time for reconfiguring is exceeded, and/or an unrecoverable malfunction is recognized. To this end, the failover apparatus 5 plans an emergency trajectory with a trajectory planner 15, wherein to this end, sensor data 10 are detected by the sensor system 51 of the vehicle 50 through separate signal lines 40 and supplied to the failover apparatus 5. The failover apparatus 5 then generates control signals 30 and transmits them via the separate control lines 41 to the actuator system 52 of the vehicle 50. In this manner, the failover apparatus 5 can in particular control, or respectively regulate longitudinal and transverse guidance of the vehicle 50. The vehicle 50 is then driven and parked by the failover apparatus 5 for example by executing the emergency trajectory to a road edge, wherein automated ongoing driving is blocked.

It is for example provided that the failover apparatus 5 obtains exclusive access to the actuator system 52 of the vehicle 50 in an emergency. This may for example be accomplished by hardware switching to exclusive control of the actuator system 52 through separate control lines 41, for example by means of a switching element (not shown) configured for this purpose.

Furthermore, it can be provided that the failover apparatus 5 has a robust housing 6 and is operated therein. The robust housing 6 can for example be designed like the housing of a data memory of a flight data recorder.

It can be provided that the failover apparatus 5 is operated at a location in the vehicle 50 protected from external influences and manipulation. For example, the failover apparatus 5 can be arranged on a vehicle floor mid-vehicle so that access to the failover apparatus 5 can only be obtained with great effort, or respectively the failover apparatus 5 is well protected from external mechanical influences.

Figure 2:
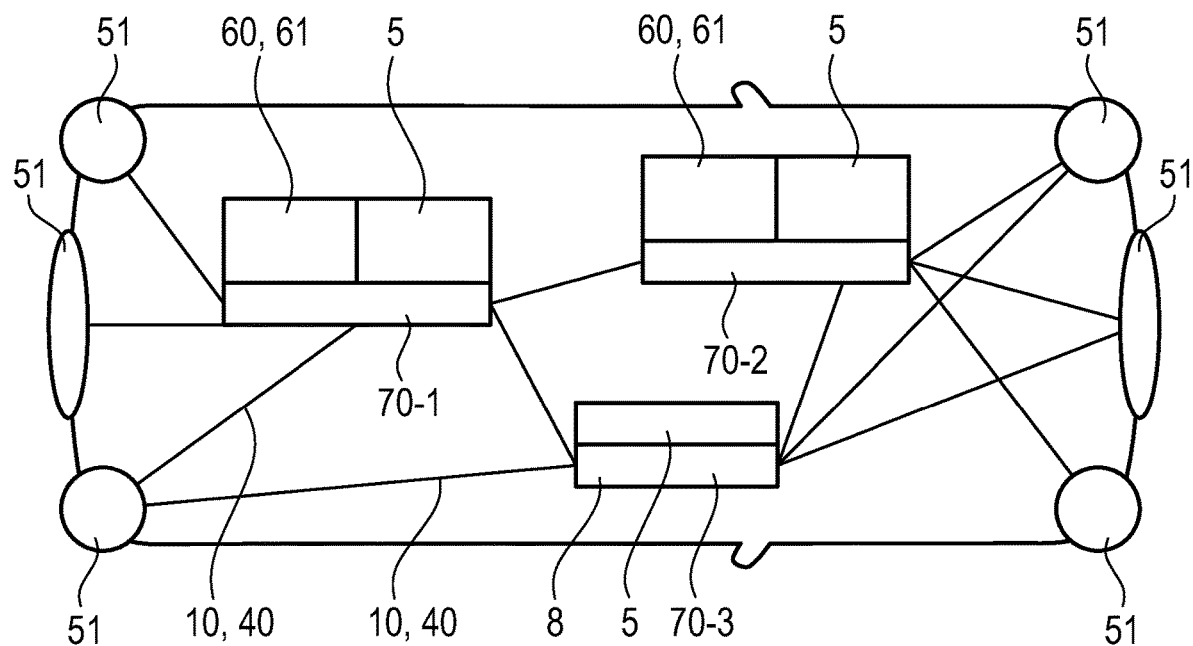
FIG. 2 shows a schematic representation to illustrate an embodiment of the device.

It may be provided that the trajectory planner 15 and other functions of the failover apparatus 5 are provided by means of a separate computing apparatus 8 (FIG. 2).

It may be provided that the failover apparatus 5 is supplied by means of a separate energy supply 7, at least during an emergency. To this end, the device 1 has a separate energy supply 7 such as a battery that is recharged by an onboard electrical system of the vehicle 50 and serves to supply energy to the failover apparatus 5 in an emergency.

It may furthermore be provided that the failover apparatus 5 is operated redundantly. For example, at least one additional failover apparatus (not shown) may be provided that operates parallel to the failover apparatus 5 in a "passive" mode and can take over a function of the failover apparatus 5 if the failover apparatus 5 itself has failed.

FIG. 2 shows a schematic representation to illustrate such an embodiment. In the embodiment shown as an example, a total of three failover apparatuses 5 are provided. The failover apparatuses 5 are executed as applications in computational nodes 70-$x$. One of the failover apparatuses 5 is operated in a computational node 70-3 of a separate computing apparatus 8 in an "active" mode. The other two failover apparatuses 5 are contrastingly executed in computational nodes 70-1, 70-2 as applications in a "passive" mode in addition to other application instances 60, 61.

All of the failover apparatuses 5 are supplied sensor data 10 from a sensor system 51 of the vehicle 50 via separate signal lines 40 (for the sake of clarity, only one signal line 40 is identified with a reference sign) which however is only schematically indicated in the representation. It may be provided in this case that the failover apparatuses 5 receive sensor data in this case from different sensors of the sensor system 51. Alternatively, it can however also be provided that all of the redundant failover apparatuses 5 receive the same sensor data. All of the failover apparatuses 5 are connected by separate control lines 41 to an actuator system (not shown) of the vehicle, wherein however in the event of a fault, only the failover apparatus 5 that is operated in an "active" mode has access to the actuator system.

LIST OF REFERENCE NUMERALS

1 Device
2 Monitor apparatus
3 Switching device
4 Redundancy restoration apparatus
5 Failover apparatus
6 Robust housing
7 Separate energy supply
8 Separate computing apparatus
10 Sensor data
11 Redundancy condition
12 Segregation condition
15 Trajectory planner
30 Control signals
40 Separate signal line
41 Separate control line
50 Vehicle
51 Sensor system
52 Actuator system
60 Application instance (active)
61 Application instance (passive)
62 Configuration
63 Switchover signal
70-$x$ Computational node The invention has been described in the preceding using various exemplary embodiments. Other variations to the

What is claimed is:

1. A method for operating an automatically driving vehicle, comprising:
executing active software application instances according to a specified configuration over more than two computational nodes, forming a distributed computing setup, wherein the specified configuration provides predefined redundancy conditions and/or predefined segregation conditions with respect to the distributed computing setup;
monitoring the active application instances for a fault;
determine a fault in one of the active application instances;
in response to determining the fault, selectively switching a functionality of the active application instance having the fault to at least one redundant software application instance being executed on the computational nodes and reconfiguring the specified configuration to restore predefined redundancy conditions and/or predefined segregation conditions;
determining a safe state upon at least one of the following conditions:
one or more specified redundancy conditions cannot be met by the reconfiguration,
at least one segregation condition cannot be met by the reconfiguration,
a specified time for reconfiguration is exceeded, and
an unrecoverable malfunction has been recognized; and
in response to the safe state being determined, planning and executing an emergency trajectory.

2. The method of claim 1, wherein planning and executing the emergency trajectory is conducted by at least one failover circuit and the at least one failover circuit obtains exclusive access to the actuator system of the vehicle in an emergency.

3. The method of claim 1, wherein planning and executing the emergency trajectory is conducted by at least one failover circuit and the at least one failover circuit is operated in a robust housing.

4. The method of claim 1, wherein planning and executing the emergency trajectory is conducted by at least one failover circuit and the at least one failover circuit is operated at a location in the vehicle protected from external influences and manipulations.

5. The method of claim 1, wherein planning and executing the emergency trajectory is conducted by at least one failover circuit and the failover circuit comprises a trajectory planner and other functions of the at least one failover circuit are provided using a separate computing apparatus.

6. The method of claim 1, wherein planning and executing the emergency trajectory is conducted by at least one failover circuit and the at least one failover circuit is supplied by a separate energy supply at least during an emergency.

7. The method of claim 1, wherein planning and executing the emergency trajectory is conducted by at least one failover circuit and the at least one failover circuit is operated redundantly.

8. An autonomous vehicle driving system, wherein in the vehicle, active software application instances are executed according to a specified configuration over more than two computational nodes, forming a distributed computing setup, wherein the specified configuration provides predefined redundancy conditions and/or predefined segregation conditions with respect to the distributed computing setup, the autonomous vehicle driving system comprising:
at least one failover circuit with separate signal lines to a sensor system of the vehicle and with separate control lines to an actuator system;
wherein the system is configured to:
monitor the active application instances for a fault;
determine a fault in one of the active application instances;
in response to determining the fault, selectively switching a functionality of the active application instance having the fault to at least one redundant software application instance being executed on the computational nodes and reconfiguring the specified configuration to restore the specified predefined redundancy conditions and/or the predefined segregation conditions;
wherein the at least one failover circuit is configured to determine a safe state upon at least one of the following conditions:
one of more specified redundancy conditions cannot be met by the reconfiguration,
at least one segregation condition cannot be met by the reconfiguration,
a specified time for reconfiguration is exceeded, and
a malfunction has been recognized; wherein
the at least one failover circuit comprises a trajectory planner circuit that is configured to plan and execute an emergency trajectory in response to the safe state being determined.

9. The device of claim 8, wherein the at least one failover circuit has a robust housing.

10. The device of claim 8, wherein the at least one failover circuit has a separate energy supply that is configured to supply the at least one failover circuit with energy at least during an emergency.

11. A vehicle comprising at least one system of claim 8, wherein the at least one failover circuit is arranged at a location in the vehicle protected from external influences and manipulations.

12. The method of claim 2, wherein planning and executing the emergency trajectory is conducted by at least one failover circuit and the at least one failover circuit is operated in a robust housing.

13. The method of claim 2, wherein planning and executing the emergency trajectory is conducted by at least one failover circuit and the at least one failover circuit is operated at a location in the vehicle protected from external influences and manipulations.

14. The method of claim 3, wherein planning and executing the emergency trajectory is conducted by at least one failover circuit and the at least one failover circuit is operated at a location in the vehicle protected from external influences and manipulations.

15. The method of claim 2, wherein planning and executing the emergency trajectory is conducted by at least one failover circuit and the failover circuit comprises a trajectory planner and other functions of the at least one failover circuit are provided using a separate computing apparatus.

16. The method of claim 3, wherein planning and executing the emergency trajectory is conducted by at least one failover circuit and the failover circuit comprises a trajectory planner and other functions of the at least one failover circuit are provided using a separate computing apparatus.

17. The method of claim 4, wherein planning and executing the emergency trajectory is conducted by at least one failover circuit and the failover circuit comprises a trajectory planner and other functions of the at least one failover circuit are provided using a separate computing apparatus.

18. The method of claim 2, wherein planning and executing the emergency trajectory is conducted by at least one failover circuit and the at least one failover circuit is supplied by a separate energy supply at least during an emergency.

19. The method of claim 3, wherein planning and executing the emergency trajectory is conducted by at least one failover circuit and the at least one failover circuit is supplied by a separate energy supply at least during an emergency.

20. The method of claim 4, wherein planning and executing the emergency trajectory is conducted by at least one failover circuit and the at least one failover circuit is supplied by a separate energy supply at least during an emergency.

* * * * *